United States Patent
Schwarz et al.

(10) Patent No.: US 9,540,948 B2
(45) Date of Patent: Jan. 10, 2017

(54) GAS TURBINE ENGINE WITH HIGH SPEED LOW PRESSURE TURBINE SECTION AND BEARING SUPPORT FEATURES

(75) Inventors: Frederick M. Schwarz, Glastonbury, CT (US); Daniel Bernard Kupratis, Wallingford, CT (US); Brian D. Merry, Andover, CT (US); Gabriel L. Suciu, Glastonbury, CT (US); William K. Ackermann, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 13/558,605

(22) Filed: Jul. 26, 2012

(65) Prior Publication Data

US 2013/0195621 A1 Aug. 1, 2013

Related U.S. Application Data

(63) Continuation of application No. 13/455,235, filed on Apr. 25, 2012, which is a continuation-in-part of application No. 13/363,154, filed on Jan. 31, 2012, now abandoned.

(51) Int. Cl.
*F02C 3/107* (2006.01)
*F01D 25/16* (2006.01)
*F02K 3/06* (2006.01)

(52) U.S. Cl.
CPC ............ *F01D 25/162* (2013.01); *F02C 3/107* (2013.01); *F02K 3/06* (2013.01)

(58) Field of Classification Search
USPC ......... 416/124; 60/226.1, 226.3, 268, 39.162
See application file for complete search history.

(56) References Cited

U.S. PATENT DOCUMENTS

| | | | |
|---|---|---|---|
| 2,608,821 A * | 9/1952 | Hunsaker | 60/268 |
| 3,287,906 A | 11/1966 | McCormick | |
| 4,809,498 A * | 3/1989 | Giffin et al. | 60/39.162 |
| 5,915,917 A | 6/1999 | Eveker et al. | |
| 6,209,311 B1 * | 4/2001 | Itoh et al. | 60/226.3 |
| 6,619,030 B1 | 9/2003 | Seda et al. | |

(Continued)

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

Kandebo, Stanley, "Geared-Turbofan Engine Design Targets Cost, Complexity", 1998, Aviation Week & Space Technology, vol. 148 Issue 8, start p. 32.*

(Continued)

*Primary Examiner* — Steven Sutherland
(74) *Attorney, Agent, or Firm* — Carlson, Gaskey & Olds, PC

(57) ABSTRACT

A gas turbine engine includes a very high speed low pressure turbine such that a quantity defined by the exit area of the low pressure turbine multiplied by the square of the low pressure turbine rotational speed compared to the same parameters for the high pressure turbine is at a ratio between about 0.5 and about 1.5. The high pressure turbine is supported by a bearing positioned at a point where the first shaft connects to a hub carrying turbine rotors associated with the second turbine section.

11 Claims, 2 Drawing Sheets

(56) References Cited

U.S. PATENT DOCUMENTS

| | | | |
|---|---|---|---|
| 7,600,370 | B2 | 10/2009 | Dawson |
| 7,694,505 | B2 | 4/2010 | Schilling |
| 7,762,086 | B2 * | 7/2010 | Schwark .......................... 60/796 |
| 8,061,969 | B2 | 11/2011 | Durocher et al. |
| 8,091,371 | B2 | 1/2012 | Durocher et al. |
| 2006/0236675 | A1 | 10/2006 | Weiler |
| 2009/0229242 | A1 | 9/2009 | Schwark |
| 2010/0148396 | A1 | 6/2010 | Xie et al. |
| 2010/0331139 | A1 | 12/2010 | McCune |
| 2012/0291449 | A1 | 11/2012 | Adams |
| 2016/0032826 | A1 | 2/2016 | Rued |

OTHER PUBLICATIONS

Mattingly et al., Aircraft Engine Design, 2002, American Institute of Aeronautics and Astronautics, 2nd Edition, p. 292.*

Jane's Aero-Engines, Issue Seven, Copyright 2000, pp. 510-512.

Mattingly et al. Aircraft Engine Design 2nd ed., American Institute of Aeronautics and Astronautics Inc., 2002, ISBN 1-56347-538-3, pp. 292-310.

International Preliminary Report on Patentability for PCT Application No. PCT/US2013/037675, mailed Nov. 6, 2014.

Supplementary European Search Report for European Application No. 13822569.3 mailed Jan. 28, 2016.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

NASA/TM 2010-216758—Assessment of Aerodynamic Challenges of a Variable-Speed Power Turbine for Large Civil Tilt-Rotor Application, Welch, Aug. 2010.

NASA/TM 2012-217605—Variable-Speed-Power-Turbine Research at Glenn Research Center, Welch, Jul. 2012.

P&W Propulsion Systems Studies, NASA High Speed Research Workshop, May 14-16, 1991.

Design Optimization of a Variable-Speed Power-Turbine, Hendricks, et al., Jul. 2014.

NASA/CR 2012-217424—Variable-Speed Power-Turbine for the Large Civil Tilt Rotor, Suchezky, Feb. 2012.

Architectural Comparison of Advanced Ultra-High Bypass Ratio Turbofans for Medium to Long Range Application, Bijewitz, 2014.

Prior Art Direct Drive Engines.

\* cited by examiner

GAS TURBINE ENGINE WITH HIGH SPEED LOW PRESSURE TURBINE SECTION AND BEARING SUPPORT FEATURES

CROSS-REFERENCE TO RELATED APPLICATION

This application is a continuation of U.S. patent application Ser. No. 13/455,235, filed on Apr. 25, 2012, which is a continuation-in-part of U.S. patent application Ser. No. 13/363,154, filed on Jan. 31, 2012 now abandoned.

BACKGROUND OF THE INVENTION

This application relates to a gas turbine engine wherein the low pressure turbine section is rotating at a higher speed and centrifugal pull stress relative to the high pressure turbine section speed and centrifugal pull stress than prior art engines.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section.

Traditionally, on many prior art engines the low pressure turbine section has driven both the low pressure compressor section and a fan directly. As fuel consumption improves with larger fan diameters relative to core diameters it has been the trend in the industry to increase fan diameters. However, as the fan diameter is increased, high fan blade tip speeds may result in a decrease in efficiency due to compressibility effects. Accordingly, the fan speed, and thus the speed of the low pressure compressor section and low pressure turbine section (both of which historically have been coupled to the fan via the low pressure spool), have been a design constraint. More recently, gear reductions have been proposed between the low pressure spool (low pressure compressor section and low pressure turbine section) and the fan.

SUMMARY

In a featured embodiment, a turbine section of a gas turbine engine has a fan drive turbine section and a second turbine section. The fan drive turbine section has a first exit area at a first exit point and is configured to rotate at a first speed. The second turbine section has a second exit area at a second exit point and is configured to rotate at a second speed, which is faster than the first speed. A first performance quantity is defined as the product of the fan drive turbine's speed squared and the fan drive turbine's exit area. A second performance quantity is defined as the product of the second speed squared and the second area. A ratio of the first performance quantity to the second performance quantity is between about 0.5 and about 1.5. The second turbine section drives a shaft which is mounted on a bearing on an outer periphery of the first shaft at a location upstream of a point where the first shaft connects to a hub carrying turbine rotors associated with said second turbine section.

In another embodiment according to the previous embodiment, the ratio is above or equal to about 0.8.

In another embodiment according to any of the previous embodiments, the fan drive turbine section has at least 3 stages.

In another embodiment according to any of the previous embodiments, the fan drive turbine section has up to 6 stages.

In another embodiment according to any of the previous embodiments, the second turbine section has 2 or fewer stages.

In another embodiment according to any of the previous embodiments, a pressure ratio across the first fan drive turbine section is greater than about 5:1.

In another embodiment according to any of the previous embodiments, a second shaft associated with the fan drive turbine is supported by a second bearing at an end of the second shaft, and downstream of the fan drive turbine.

In another embodiment according to any of the previous embodiments, the fan drive turbine and second turbine sections are configured to rotate in opposed directions.

In another embodiment according to any of the previous embodiments, there is no mid-turbine frame positioned intermediate the fan drive turbine and second turbine sections.

In another featured embodiment, a gas turbine engine has a fan, a compressor section in fluid communication with the fan, a combustion section in fluid communication with the compressor section, and a turbine section in fluid communication with the combustion section. The turbine section includes a fan drive turbine section and a second turbine section. The fan drive turbine section has a first exit area at a first exit point and is configured to rotate at a first speed. The second turbine section has a second exit area at a second exit point and is configured to rotate at a second speed, which is higher than the first speed. A first performance quantity is defined as the product of the fan drive turbine's speed squared and the fan drive turbine's area. A second performance quantity is defined as the product of the second turbine's speed squared and the second turbine's area. A ratio of the first performance quantity to the second performance quantity is between about 0.5 and about 1.5. The second turbine section drives a shaft which is mounted on a bearing on an outer periphery of the first shaft at a location upstream of a point where the first shaft connects to a hub carrying turbine rotors associated with said second turbine section.

In another embodiment according to the previous embodiment, the ratio is above or equal to about 0.8.

In another embodiment according to any of the previous embodiments, the compressor section includes a first and second compressor sections. The fan drive turbine section and the first compressor section are configured to rotate in a first direction. The second turbine section and the second compressor section and are configured to rotate in a second opposed direction.

In another embodiment according to any of the previous embodiments, a gear reduction is included between the fan and a low spool driven by the fan drive turbine section such that the fan is configured to rotate at a lower speed than the fan drive turbine section.

In another embodiment according to any of the previous embodiments, the fan rotates in the second opposed direction.

In another embodiment according to any of the previous embodiments, a second shaft associated with the fan drive turbine is supported by a second bearing at an end of the second shaft, and downstream of the fan drive turbine.

In another embodiment according to any of the previous embodiments, a third bearing supports the second compressor section on an outer periphery of the first shaft driven by the second turbine section.

In another embodiment according to any of the previous embodiments, a fourth bearing is positioned adjacent the first compressor section, and supports an outer periphery of the second shaft which is configured to rotate with the fan drive turbine section.

In another embodiment according to any of the previous embodiments, there is no mid-turbine frame positioned intermediate the first and second turbine sections.

In another featured embodiment, a gas turbine engine has a fan, a compressor section in fluid communication with the fan, a combustion section in fluid communication with the compressor section, and a turbine section in fluid communication with the combustion section. The turbine section includes a fan drive turbine section and a second turbine section. The fan drive turbine section has a first exit area at a first exit point and is configured to rotate at a first speed. A second turbine section has a second exit area at a second exit point and is configured to rotate at a second speed, which is higher than the first speed. A first performance quantity is defined as the product of the first speed squared and the first area. A second performance quantity is defined as the product of the second speed squared and the second area. A ratio of the first performance quantity to the second performance quantity is between about 0.8 and about 1.5. The compressor section includes first and second compressor sections. The fan drive turbine section and the first compressor section will rotate in a first direction and the second turbine section and the second compressor section will rotate in a second opposed direction. A gear reduction is included between the fan and first compressor section, such that the fan will rotate at a lower speed than the fan drive turbine section, and rotate in the second opposed direction.

In another embodiment according to the previous embodiment, a gear ratio of the gear reduction is greater than about 2.3.

These and other features of this disclosure will be better understood upon reading the following specification and drawings, the following of which is a brief description.

DETAILED DESCRIPTION

Figure 1:
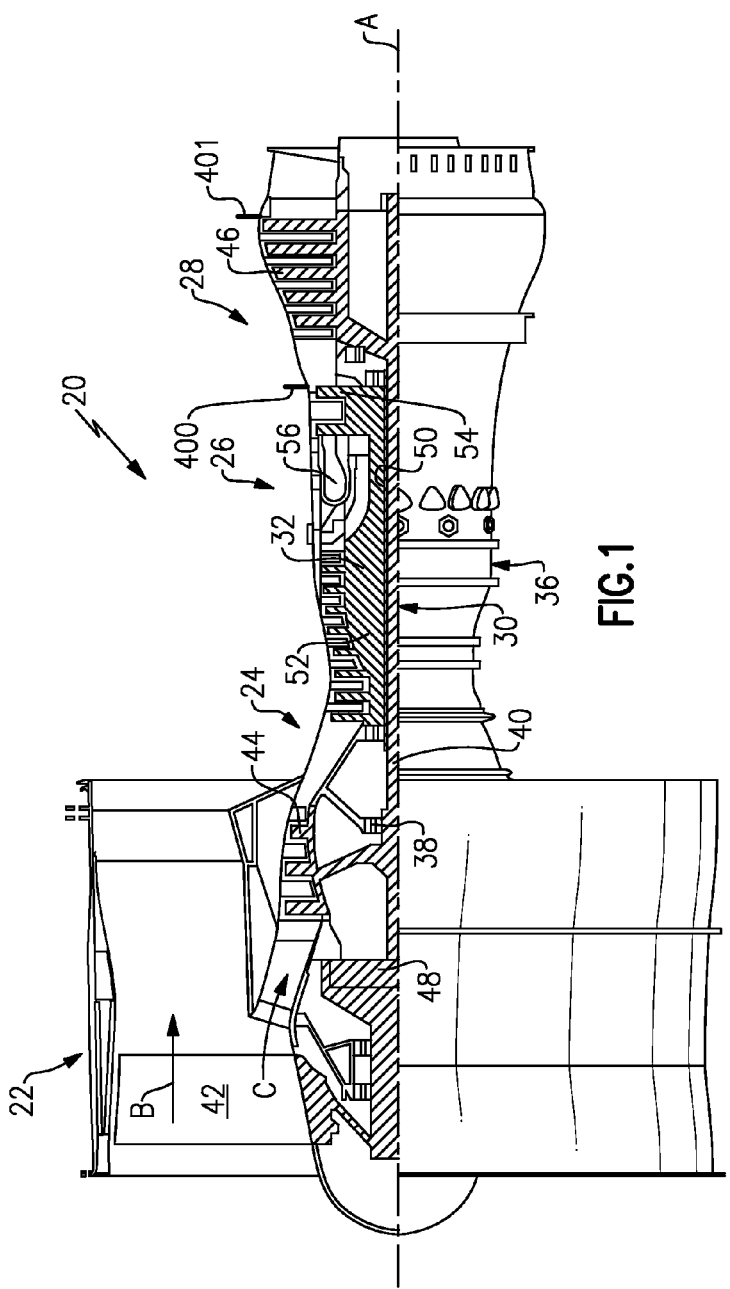
FIG. 1 shows a gas turbine engine.

FIG. 1 schematically illustrates a gas turbine engine 20. The gas turbine engine 20 is disclosed herein as a two-turbine turbofan that generally incorporates a fan section 22, a compressor section 24, a combustor section 26 and a turbine section 28. Alternative engines might include an augmentor section (not shown) among other systems or features. The fan section 22 drives air along a bypass flow path B while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-turbine architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an innermost shaft 40 that interconnects a fan 42, a low pressure (or first) compressor section 44 and a low pressure (or first) turbine section 46. Note turbine section 46 will also be known as a fan drive turbine section. The inner shaft 40 is connected to the fan 42 through a geared architecture 48 to drive the fan 42 at a lower speed than the low speed fan drive turbine 46. The high speed spool 32 includes a more outer shaft 50 that interconnects a high pressure (or second) compressor section 52 and high pressure (or second) turbine section 54. A combustor 56 is arranged between the high pressure compressor section 52 and the high pressure turbine section 54. As used herein, the high pressure turbine section experiences higher pressures than the low pressure turbine section. A low pressure turbine section is a section that powers a fan 42. The inner shaft 40 and the outer shaft 50 are concentric and rotate via bearing systems 38 about the engine central longitudinal axis A which is collinear with their longitudinal axis.

The core airflow C is compressed by the low pressure compressor section 44 then the high pressure compressor section 52, mixed and burned with fuel in the combustor 56, then expanded over the high pressure turbine section 54 and low pressure turbine section 46.

The engine 20 in one example is a high-bypass geared aircraft engine. The bypass ratio is the amount of air delivered into bypass path B divided by the amount of air into core path C. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine section 46 has a pressure ratio that is greater than about 5. In one disclosed embodiment, the engine 20 bypass ratio is greater than about ten (10:1), the fan diameter is significantly larger than that of the low pressure compressor section 44, and the low pressure turbine section 46 has a pressure ratio that is greater than about 5:1. In some embodiments, the high pressure turbine section may have two or fewer stages. In contrast, the low pressure turbine section 46, in some embodiments, has between 3 and 6 stages. Further the low pressure turbine section 46 pressure ratio is total pressure measured prior to inlet of low pressure turbine section 46 as related to the total pressure at the outlet of the low pressure turbine section 46 prior to an exhaust nozzle. The geared architecture 48 may be an epicycle gear train, such as a star gear system or other gear system, with a gear reduction ratio of greater than about 2.5:1. It should be understood, however, that the above parameters are only exemplary of one embodiment of a geared architecture engine A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC"). TSFC is the industry standard parameter of the rate of lbm of fuel being burned per hour divided by lbf of thrust the engine produces at that flight condition. "Low fan pressure ratio" is the ratio of total pressure across the fan blade alone, before the fan exit guide vanes. The low fan pressure ratio as disclosed herein according to one non-limiting embodiment is less than about 1.45. "Low corrected fan tip speed" is the actual fan tip speed in ft/sec divided by an industry standard temperature correction of [(Ram Air Temperature deg R)/518.7)^0.5]. The "Low corrected fan tip speed" as disclosed herein according to one non-limiting embodiment is less than about 1150 ft/second. Further, the fan 42 may have 26 or fewer blades.

Figure 2:
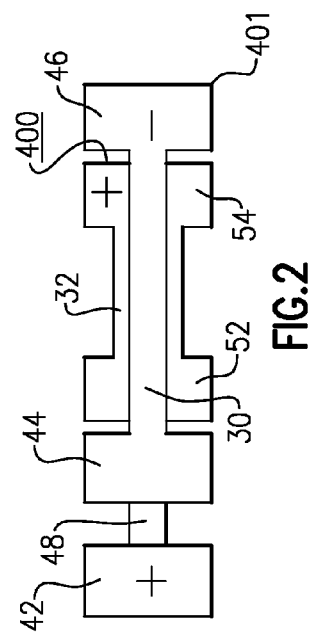
FIG. 2 schematically shows the arrangement of the low and high spool, along with the fan drive.

An exit area 400 is shown, in FIG. 1 and FIG. 2, at the exit location for the high pressure turbine section 54 is the annular area of the last blade of turbine section 54. An exit area for the low pressure turbine section is defined at exit 401 for the low pressure turbine section is the annular area defined by the last blade of that turbine section 46. As shown in FIG. 2, the turbine engine 20 may be counter-rotating. This means that the low pressure turbine section 46 and low pressure compressor section 44 rotate in one direction ("−"), while the high pressure spool 32, including high pressure turbine section 54 and high pressure compressor section 52 rotate in an opposed direction ("+"). The gear reduction 48, which may be, for example, an epicyclic transmission (e.g., with a sun, ring, and star gears), is selected such that the fan 42 rotates in the same direction ("+") as the high spool 32. With this arrangement, and with the other structure as set forth above, including the various quantities and operational ranges, a very high speed can be provided to the low pressure spool. Low pressure turbine section and high pressure turbine section operation are often evaluated looking at a performance quantity which is the exit area for the turbine section multiplied by its respective speed squared. This performance quantity ("PQ") is defined as:

$$PQ_{ltp}=(A_{lpt} \times V_{lpt}^2) \qquad \text{Equation 1}$$

$$PQ_{hpt}=(A_{hpt} \times V_{hpt}^2) \qquad \text{Equation 2}$$

the low pressure turbine section, where $A_{hpt}$ is the area of the high pressure turbine section at the exit thereof (e.g., at 400), and where $V_{hpt}$ is the speed of the high pressure turbine section. As known, one would evaluate this performance quantity at the redline speed for each turbine section.

Thus, a ratio of the performance quantity for the low pressure turbine section compared to the performance quantify for the high pressure turbine section is:

$$(A_{lpt} \times V_{lpt}^2)/(A_{hpt} \times V_{hpt}^2)=PQ_{ltp}/PQ_{hpt} \qquad \text{Equation 3}$$

In one turbine embodiment made according to the above design, the areas of the low and high pressure turbine sections are 557.9 in² and 90.67 in², respectively. Further, the redline speeds of the low and high pressure turbine sections are 10179 rpm and 24346 rpm, respectively. Thus, using Equations 1 and 2 above, the performance quantities for the low and high pressure turbine sections are:

$$PQ_{ltp}=(A_{lpt} \times V_{lpt}^2)=(557.9 \text{ in}^2)(10179 \text{ rpm})^2= \\ 57805157673.9 \text{ in}^2\text{rpm}^2 \qquad \text{Equation 1}$$

$$PQ_{hpt}=(A_{hpt} \times V_{hpt}^2)=(90.67 \text{ in}^2)(24346 \text{ rpm})^2= \\ 53742622009.72 \text{ in}^2\text{rpm}^2 \qquad \text{Equation 2}$$

and using Equation 3 above, the ratio for the low pressure turbine section to the high pressure turbine section is:

$$\text{Ratio}=PQ_{ltp}/PQ_{hpt}=57805157673.9 \text{ in}^2\text{rpm}^2/ \\ 53742622009.72 \text{ in}^2\text{rpm}^2=1.075$$

In another embodiment, the ratio was about 0.5 and in another embodiment the ratio was about 1.5. With $PQ_{ltp}/PQ_{hpt}$ ratios in the 0.5 to 1.5 range, a very efficient overall gas turbine engine is achieved. More narrowly, $PQ_{ltp}/PQ_{hpt}$ ratios of above or equal to about 0.8 are more efficient. Even more narrowly, $PQ_{ltp}/PQ_{hpt}$ ratios above or equal to 1.0 are even more efficient. As a result of these $PQ_{ltp}/PQ_{hpt}$ ratios, in particular, the turbine section can be made much smaller than in the prior art, both in diameter and axial length. In addition, the efficiency of the overall engine is greatly increased.

The low pressure compressor section is also improved with this arrangement, and behaves more like a high pressure compressor section than a traditional low pressure compressor section. It is more efficient than the prior art, and can provide more compression in fewer stages. The low pressure compressor section may be made smaller in radius and shorter in length while contributing more toward achieving the overall pressure ratio design target of the engine.

Figure 3:
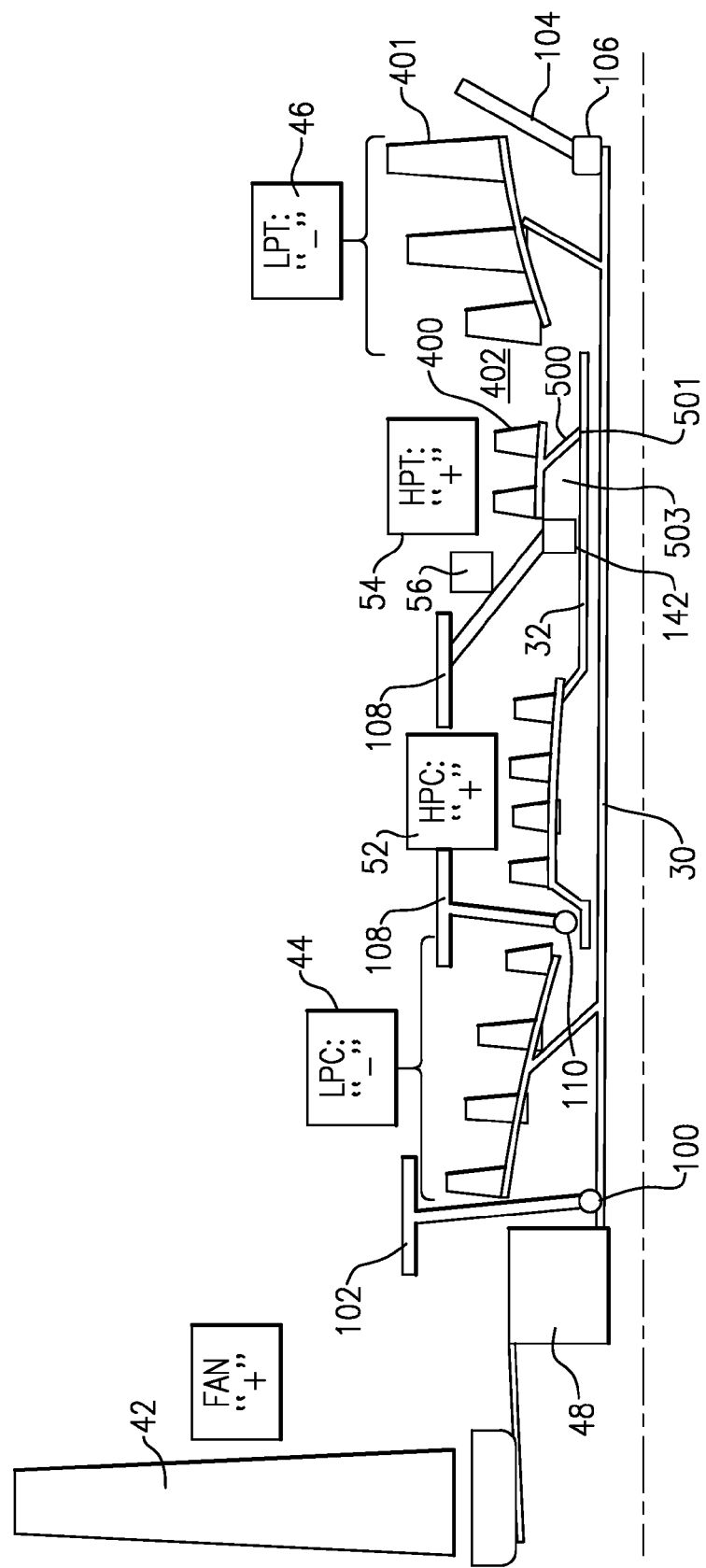
FIG. 3 shows a schematic view of a mount arrangement for an engine such as shown in FIGS. 1 and 2.

As shown in FIG. 3, the engine as shown in FIG. 2 may be mounted such that the high pressure turbine 54 is "overhung" bearing mounted. As shown, the high spool and shaft 32 includes a bearing 142 which supports the high pressure turbine 54 and the high spool 32 on an outer periphery of a shaft that rotates with the high pressure turbine 54. As can be appreciated, the "overhung" mount means that the bearing 142 is at an intermediate location on the spool including the shaft, the high pressure turbine 54, and the high pressure compressor 52. Stated another way, the bearing 142 is supported upstream of a point 501 where the shaft 32 connects to a hub 500 carrying turbine rotors associated with the high pressure turbine (second) turbine section 54. Notably, it would also be downstream of the combustor 56. This of course also means it will be downstream of the high pressure compressor 52. Note that the bearing 142 can be positioned inside an annulus 503 formed by the shaft 32 and the hub assembly 500 so as to be between the shaft and the feature numbered 106 and it still would be an "overhung" configuration.

The forward end of the high spool 32 is supported by a bearing 110 at an outer periphery of the shaft 32. The bearings 110 and 142 are supported on static structure 108 associated with the overall engine casings arranged to form the core of the engine as is shown in FIG. 1. In addition, the shaft 30 is supported on a bearing 100 at a forward end. The bearing 100 is supported on static structure 102. A rear end of the shaft 30 is supported on a bearing 106 which is attached to static structure 104.

With this arrangement, there is no bearing support struts or other structure in the path of hot products of combustion passing downstream of the high pressure turbine 54, and no bearing compartment support struts in the path of the products of combustion as they flow across to the low pressure turbine 46.

As shown, there is no mid-turbine frame or bearings mounted in the area 402 between the turbine sections 54 and 46.

While this invention has been disclosed with reference to one embodiment, it should be understood that certain modifications would come within the scope of this invention. For that reason, the following claims should be studied to determine the true scope and content of this invention.

The invention claimed is:
1. A gas turbine engine comprising:
   a fan;
   a compressor section in fluid communication with the fan;
   a combustion section in fluid communication with the compressor section;
   a turbine section in fluid communication with the combustion section,
   wherein the turbine section includes a fan drive turbine section and a second turbine section, said fan drive turbine section driving said fan through a gear reduction;

wherein said fan drive turbine section has a first exit area at a first exit point and is configured to rotate at or below a first speed, wherein said second turbine section has a second exit area at a second exit point and is configured to rotate at or below a second speed, which is higher than the first speed, and said first and second speeds being redline speeds, wherein a first performance quantity is defined as the product of the first speed squared and the first area, wherein a second performance quantity is defined as the product of the second speed squared and the second area;

wherein a ratio of the first performance quantity to the second performance quantity is between 0.5 and 1.5;

said second turbine section driving a first shaft, and said first shaft being mounted on a bearing, said bearing being mounted on an outer periphery of said first shaft at a location upstream of a point where the first shaft connects to a hub carrying turbine rotors associated with said second turbine section, with said location being downstream of said compressor section.

2. The gas turbine engine as set forth in claim 1, wherein said ratio is above or equal to 0.8.

3. The gas turbine engine as set forth in claim 1, wherein the compressor section includes a first compressor section and a second compressor section, wherein the fan drive turbine section and the first compressor section are configured to rotate in a first direction, and wherein the second turbine section and the second compressor section are configured to rotate in a second opposed direction.

4. The gas turbine engine as set forth in claim 3, wherein said fan rotates in the second opposed direction.

5. The gas turbine engine as set forth in claim 3, wherein a second shaft associated with said fan drive turbine section is supported by a second bearing at an end of said second shaft, and downstream of said fan drive turbine section.

6. The gas turbine engine as set forth in claim 5, wherein a third bearing supports said second compressor section on an outer periphery of said first shaft driven by said second turbine section.

7. The gas turbine engine as set forth in claim 6, wherein a fourth bearing is positioned adjacent said first compressor section, and supports an outer periphery of said second shaft which is configured to rotate with said fan drive turbine section.

8. The gas turbine engine as set forth in claim 3, wherein there is no bearing support structure positioned intermediate said first and second turbine sections.

9. The gas turbine engine as set forth in claim 1, wherein said ratio is above or equal to 1.0.

10. A gas turbine engine comprising:

a fan;

a compressor section in fluid communication with the fan;

a combustion section in fluid communication with the compressor section;

a turbine section in fluid communication with the combustion section, wherein the turbine section includes a fan drive turbine section and a second turbine section, wherein said fan drive turbine section has a first exit area at a first exit point and is configured to rotate at or below a first speed, wherein said second turbine section has a second exit area at a second exit point and is configured to rotate at or below a second speed, which is higher than the first speed, and said first and second speeds being redline speeds, wherein a first performance quantity is defined as the product of the first speed squared and the first area, wherein a second performance quantity is defined as the product of the second speed squared and the second area;

wherein a ratio of the first performance quantity to the second performance quantity is between 0.8 and 1.5; and the compressor section including a first compressor section and a second compressor section, wherein the fan drive turbine section and the first compressor section will rotate in a first direction and the second turbine section and the second compressor section will rotate in a second opposed direction, a gear reduction included between said fan and first compressor section, such that the fan will rotate at a lower speed than the fan drive turbine section, and said fan will rotate in the second opposed direction.

11. The gas turbine engine as set forth in claim 10, wherein said ratio is above or equal to 1.0.

* * * * *